United States Patent
Bragg et al.

(10) Patent No.: US 8,194,554 B2
(45) Date of Patent: Jun. 5, 2012

(54) METHOD AND APPARATUS FOR PROVIDING BYPASS CONNECTIVITY BETWEEN ROUTERS

(75) Inventors: Nigel Bragg, Weston Colville (GB); David Allan, Ottawa (CA)

(73) Assignee: Ciena Corporation, Linthicum, MD (US)

( * ) Notice: Subject to any disclaimer, the term of this patent is extended or adjusted under 35 U.S.C. 154(b) by 307 days.

(21) Appl. No.: 12/571,722

(22) Filed: Oct. 1, 2009

(65) Prior Publication Data

US 2011/0080836 A1    Apr. 7, 2011

(51) Int. Cl.
*H04L 12/26* (2006.01)
(52) U.S. Cl. ......................................................... 370/241
(58) Field of Classification Search .................. 370/241, 370/241.1
See application file for complete search history.

(56) References Cited

U.S. PATENT DOCUMENTS

| | | | |
|---|---|---|---|
| 7,058,845 B2* | 6/2006 | Fujita | 714/4.2 |
| 7,830,786 B2* | 11/2010 | Atlas et al. | 370/217 |
| 7,936,680 B2* | 5/2011 | Osswald | 370/236 |
| 2003/0147346 A1* | 8/2003 | Kanakubo | 370/227 |
| 2009/0268739 A1* | 10/2009 | Dunbar et al. | 370/392 |
| 2010/0061227 A1* | 3/2010 | Sundt et al. | 370/221 |
| 2011/0063985 A1* | 3/2011 | Wang et al. | 370/248 |

* cited by examiner

*Primary Examiner* — Gary Mui
(74) *Attorney, Agent, or Firm* — Tyler S. Brown (57) ABSTRACT

Forwarding Adjacencies (FAs) can be set up between IP/MPLS routers without requiring a Routing Adjacency (RA) to be brought up for every FA. This enables increased bypass connectivity to be established between end-point routers in the IP/MPLS network without attendant additional processing associated with having dedicated RA for each FA. Where it is possible to modify the end-point routers, the physical ports may be configured to support stand-alone FAs. A configured FA at a physical port is then associated with an IP address of a remote end-point router and a connection within the bypass technology. OAM is used to verify connectivity and configuration across the FA. Alternatively, an emulated Ethernet LAN segment may be used for IP traffic to enable full mesh connectivity to be provided by the bypass technology while requiring only one or a small number of RAs to be implemented at each end-point router.

18 Claims, 5 Drawing Sheets

METHOD AND APPARATUS FOR PROVIDING BYPASS CONNECTIVITY BETWEEN ROUTERS

TECHNICAL FIELD

The present invention relates to communication networks and, more particularly, to a method and apparatus for providing bypass connectivity between routers.

BACKGROUND

Data communication networks may include various computers, servers, nodes, routers, switches, bridges, hubs, proxies, and other network devices coupled together and configured to pass data to one another. These devices will be referred to herein as "network elements." Data is communicated through the data communication network by passing protocol data units, such as data frames, packets, cells, or segments, between the network elements by utilizing one or more communication links. A particular protocol data unit may be handled by multiple network elements and cross multiple communication links as it travels between its source and its destination over the network.

The various network elements on the communication network communicate with each other using predefined sets of rules, referred to herein as protocols. Different protocols are used to govern different aspects of the communication, such as how signals should be formed for transmission between network elements, various aspects of what the protocol data units should look like, how packets should be handled or routed through the network by the network elements, and how information associated with routing information should be exchanged between the network elements. Networks that use different protocols operate differently and are considered to be different types of communication networks. A given communication network may use multiple protocols at different network layers to enable network elements to communicate with each other across the network.

One protocol, commonly referred to as MultiProtocol Label Switching (MPLS), specifies a way in which a label switched path may be established through a network. Briefly, label switch routers within the network are configured to read a label associated with a packet, replace (often referred to as swap) the original label with a new label, and forward the packet out of a corresponding port. Routers along a label switched path through the network will exchange labels in this manner to forward traffic along the path. To enable more than one customer to use a given path, a PseudoWire (PW) tag may be applied to the traffic at the ingress to allow the traffic to be differentiated at the egress. A service that utilizes a pseudowire will be referred to as a Virtual Private Wire Service (VPWS). Multiple protocols operate together to enable a MPLS network to function correctly. For example, there is a protocol that governs distribution of labels, another protocol that governs distribution of PW tags, a protocol that governs establishment of the label switched path, a routing protocol such as an Interior Gateway Protocol run between the network elements, and numerous other protocols as known to a person skilled in the art.

In operation, the MPLS network will establish label switched paths through the network using a Label Distribution Protocol (LDP). As part of this process, the LDP will allow the Label Edge Routers (LERs) to exchange Forwarding Equivalency Class (FEC) to label bindings to permit the LERs to map traffic to LSPs corresponding to the desired LER for egress from the MPLS network. When a frame arrives at the ingress LER, the LER will map the frame to a FEC, either by packet inspection or port/service association, and hence select a label to apply to the frame. The label will be used (swapped) by the Label Switch Routers (LSRs) to forward the frame across the Label Switched Path (LSP) through the network. Further nested labels such as PseudoWire labels may have been applied by the ingress LSR to permit the egress LER to identify the forwarder that should handle the frame at the egress, to cause it to be forwarded to the correct customer.

MPLS networks typically operate on top of a lower layer network such as a SONET/SDH network, Optical Transport Network (OTN), or layer 2 packet-switched technology such as Ethernet. Several types of Ethernet networks may be used to carry MPLS traffic, such as Ethernet defined by IEEE 802.1ah (Provider Backbone Bridging or "PBB"), IEEE 802.1Qay (Provider Backbone Bridging—Traffic Engineering or "PBB-TE"), or IEEE 802.1aq (Shortest Path Bridging, also known as Provider Link State Bridging).

Network operators are increasingly becoming interested in having the ability to perform fine-grained traffic engineering on MPLS networks. Simultaneously, network operators may seek to avoid tandem routing (transit of intermediate label switch routers on the LSP in which label-swapping is the only data path operation), by moving traffic off the IP/MPLS routed path, and onto a path at the lower layer, referred to herein as the "bypass layer". This enables the MPLS traffic to bypass the tandem routers or permit them to be eliminated from the network entirely. As noted above, the lower layer is typically SONET/SDH, OTN, or a layer 2 packet-switched technology. An Ethernet handoff is often used between the IP/MPLS layer and the bypass layer.

To enable paths in the bypass layer to be used to move traffic off the LSP to avoid the tandem routers, the network is constructed such that the label edge routers are directly connected by the bypass technology. The term "bypass technology" will be used herein to refer to the lower layer network protocol implementing the bypass layer over which the MPLS network is running.

Internet Engineering Task Force (IETF) Request For Comments (RFC) 4206 discloses one technique by which the overhead of superfluous routing exchange may be avoided. In IETF RFC 4206 a Forwarding Adjacency (FA) is created administratively between the end-point routers which they may use to forward traffic between each other in preference to the normal routed path. Such a Forwarding Adjacency can include path segments installed in the underlying bypass technology only if the bypass technology is using the same Control Plane instance as the MPLS layer, which is not always desirable. However, if the desired adjacency appears as a point-to-point link at the routing layer (the client MPLS layer), typically because the bypass layer is running an autonomous Control Plane, then the adjacency will be advertised into the routing protocol in use on the MPLS network as if it were a physical link connecting the two end-point routers within the MPLS network. Advertising the bypass links as if they are physical links connecting pairs of end-point routers within the MPLS network will cause a separate Routing Adjacency to be established for each such link. This is because, in this model, the MPLS layer and the bypass layer have a client-server relationship, with the bypass layer offering complete transparency to the client layer and providing no visibility of the bypass (server) layer topology. At the lower layer, e.g. the Ethernet layer, traffic engineered paths may be used to convey the traffic flows between the end-point routers.

The RFC 4206 concept of administratively created Forwarding Adjacencies are both created and used as a TE link by exactly the same instance of the GMPLS control plane. Thus, the concept of a Forwarding Adjacency is applicable only when an LSP is both created and used as a TE link by exactly the same instance of the GMPLS control plane. Accordingly, if the Forwarding Adjacency is set up over a bypass connection using this method implied by RFC 4206 (using control plane peering rather than the client-server model) then the FA is not seen as a transparent connection at the routing layer, and the ports on the end-point routers which interface to the bypass technology must still form Routing & Signaling Adjacencies, except now with the bypass technology layer rather than the remote end-point routers. Thus, in this manner, the IGP in use at the MPLS layer would form a Routing Adjacency with the underlying technology rather than directly with the other end point MPLS router. This requirement for control plane peering between MPLS and the bypass technology is liable to be significantly more complex operationally than the traditional client-server relationship between MPLS and transport. Furthermore, this integrated control plane model is a poor fit to the internal structure of many communications providers, where separate organizations have total responsibility for the operation of different layers of the overall network.

As noted above, although it is possible to use the bypass technology to enable traffic to be forwarded directly between pairs of MPLS routers and away from the tandem routers, doing so frequently results in the creation of a large number of routing adjacencies due to the number of LERs directly connected at the MPLS layer. Since implementing Routing Adjacencies consumes a relatively large amount of processor resources on the MPLS routers, there is a practical limit to the number of Routing Adjacencies, and hence paths through the bypass layer, that may be implemented at a given MPLS router. Accordingly, it would be desirable to provide a way to reduce the number of routing adjacencies as only a small number are actually needed for robust exchange of routing information.

SUMMARY

The following Summary and the Abstract set forth at the end of this application are provided herein to introduce some concepts discussed in the Detailed Description below. The Summary and Abstract sections are not comprehensive and are not intended to delineate the scope of protectable subject matter which is set forth by the claims presented below.

A method and apparatus for providing bypass connectivity between routers enables Forwarding Instances to be set up between IP/MPLS routers which allow the IP/MPLS routers to use bypass paths to forward traffic directly between each other without requiring a separate Routing Adjacency to be brought up for every pair of MPLS routers that are interconnected by the bypass layer in this manner, nor requiring the bypass layer and the MPLS layer to run a common Control Plane instance. In one embodiment, one or more physical or virtual ports in the end-point routers are designated as supporting stand-alone Forwarding Instances. The Forwarding Instances are correspondingly configured at peer routers. Where the physical or virtual port terminates on a node implementing the bypass technology, each such Forwarding Instance is associated with a bypass connection that leads to the remote peer. The Forwarding Instance is also associated with an IP address of the remote router, preferably the remote router's loopback IP address, knowledge of which is either administratively configured or a protocol could be defined to permit peer discovery. If multiple Forwarding Instances share a common physical port, the aforementioned virtual ports, each Forwarding Instance will also be associated with a local interface identifier, an Ethernet VLAN ID being an exemplar.

Once configured, the pair of end-point routers will establish an OAM session over the connection identified to the bypass technology by the local identifier and identified to the IP layer by the routers' respective IP addresses. The OAM session allows the end-to-end integrity of the connection to be verified and allows each router to verify that its remote end-point router peer matches the intended local configuration. This is a refinement of traditional IP routing behavior, in which the successful formation of a Routing Adjacency was also used to validate the integrity of the link. Once verified, the pair of end-point routers set up a Label Distribution Protocol (LDP) signaling adjacency to exchange Forwarding Equivalency Class (FEC) to label bindings. The Forwarding Instance will then be advertised into the IGP by the end-point routers as set forth in RFC 4206 and hence will become available to carry traffic on the network.

This embodiment requires the end-point routers to be modified to enable physical and virtual ports to be designated as supporting Forwarding Instances. If the end-point routers are not able to be configured in this manner, an alternative embodiment enables a similar increase in scalability by protocol demultiplexing control traffic onto one or more emulated Ethernet LAN segments, while similarly using protocol demultiplexing to map MPLS labeled traffic onto Ethernet engineered paths, such that the benefit of a traffic engineered underlay can be achieved without the usual implied growth in Routing Adjacencies (e.g. in technologies such as IP over ATM).

In this alternative embodiment, the end-point routers may form Routing Adjacencies on any NNI port supporting a MPLS Forwarding Adjacency such that there is a one-to-one correspondence between Routing Adjacency and Forwarding Adjacency. Alternatively, according to the preferred embodiment of the invention, the Forwarding Adjacency may be associated with an emulated Ethernet LAN segment offering Multi-Point to Multi-Point connectivity between multiple end-point routers. For example, the Ethernet LAN segment emulation may be delivered by a technology such as Shortest Path Backbone Bridging (IEEE 802.1aq). The Routing Adjacency required to support the Forwarding Adjacency is established with a designated router on the LAN segment so that one Routing Adjacency can be used to directly connect a MPLS router with a set of other MPLS routers rather than a single other MPLS router. IP traffic is demultiplexed and transmitted between the MPLS routers on the emulated LAN segment whereas MPLS traffic is mapped to connections in the bypass technology. As in the first embodiment, IP layer OAM sessions are used between the Forwarding Adjacency peers to validate bypass connection integrity and to receive rapid notification of any failures.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

Figure 1:
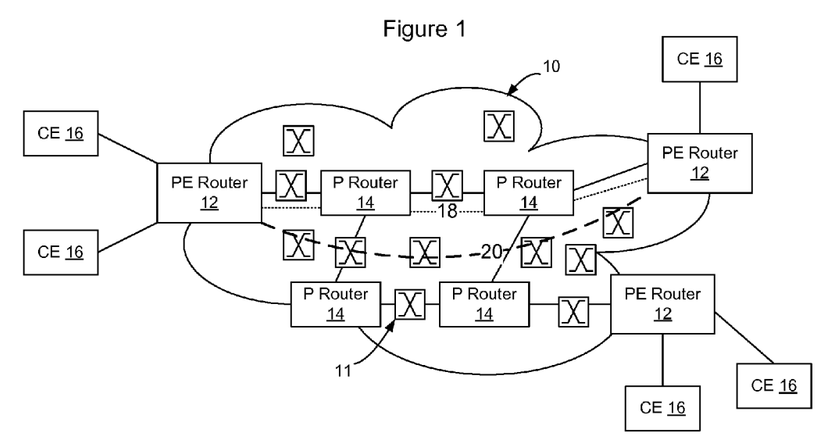
FIG. 1 is a functional block diagram of an MPLS network showing a Label Switched Path through the network between a pair of end-point routers and a bypass route supported by an underlying transport technology between the same pair of end-point routers.

FIG. 1 shows an example MPLS network 10 in which Provider Edge (PE) routers 12 are interconnected by tandem Provider (P) routers 14. Customer Edge (CE) routers 16 forward packets of data to the PE routers which forward the packets on Label Switched Paths, such as LSP 18, across the MPLS network. For example, when a PE router 12 receives a data packet from a Customer Edge router 16, the PE router will make a forwarding determination and, based on that forwarding determination, apply one or more MPLS labels to the packet and forward the packet onto the MPLS network 10. The packet will travel along LSP 18 and each P router on the LSP will make a forwarding decision for the packet so that the packet may continue to follow LSP 18 through the MPLS network. The MPLS network may be implemented over an underlying bypass technology, such as an Ethernet network. In FIG. 1, the underlying bypass technology is illustrated by network elements 11 which provide connectivity between the PE and P routers on the MPLS network.

As shown in FIG. 1, forwarding traffic on a LSP through the MPLS network may cause the packet to received and routed by one or more P routers as it passes through the network. To reduce the number of routing hops required for a particular class of packets, the end-point routers (PE routers 12) may establish a connection between each other through the underlying bypass network such as a SONET/SDH, Optical Transport Network (OTN), or an Ethernet network. To utilize the bypass connection, the MPLS layer will hand off the packet to the lower layer transport technology 20 for transmission on the lower layer network. In this manner the data packet may be forwarded to the same end-point router as it could via the LSP 18, but without requiring the data packet to be forwarded through the tandem (intermediate) P-routers. This saves capacity on those routers, which are disproportionately expensive, and may accelerate transportation of the data packet through the network.

Figure 2:
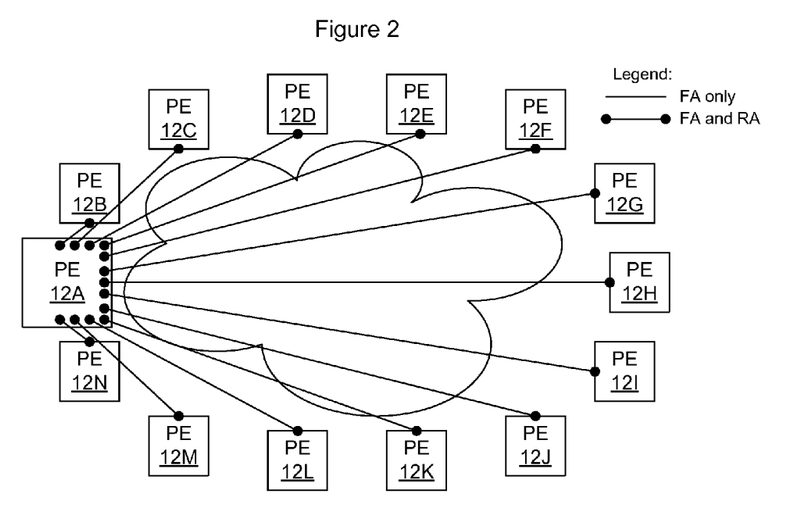
FIG. 2 is a functional block diagram of an MPLS network showing that subset of Forwarding Adjacencies associated with a single end-point router of a full mesh of Forwarding Adjacencies and Routing Adjacencies between end-point routers in the MPLS network.

To enable each PE router to directly transmit traffic to each other PE router on the MPLS network via the underlying bypass layer, it was conventionally necessary for the PE router to establish a Routing Adjacency with each other PE router. Further, IETF RFC 4206 describes how bypass connections may be implemented when the bypass and MPLS layers run under a common control plane. In FIG. 2 the lines between the PE routers represent the Forwarding Adjacencies between the PE routers and the dots at the ends of the lines represent a Routing Adjacency between the PE routers. As shown in FIG. 2, when a bypass connection is established between a pair of routers, the routers will establish a Routing Adjacency to enable the physical link to be validated and via this process discover the particulars of the system at the far end of the link. Specifically, conventional IP did not include data plane OAM or peer discovery mechanisms outside of routing exchange, and accordingly the Routing Adjacency between the peer end-point routers enabled connectivity between the end-point routers to be both discovered and verified. As shown in FIG. 2, if a full mesh of bypass connections is desired between all pairs of end-point routers, the number of Forwarding Adjacencies and, hence Routing Adjacencies, supported by a router will be on the order of the number of peer network elements on the MPLS network. Thus, in FIG. 2, PE router 12A has one Routing Adjacency process instantiated in its control plane for each of the Forwarding Adjacencies that have been established with each of the other peer PE routers 12B-12N.

Figure 3:
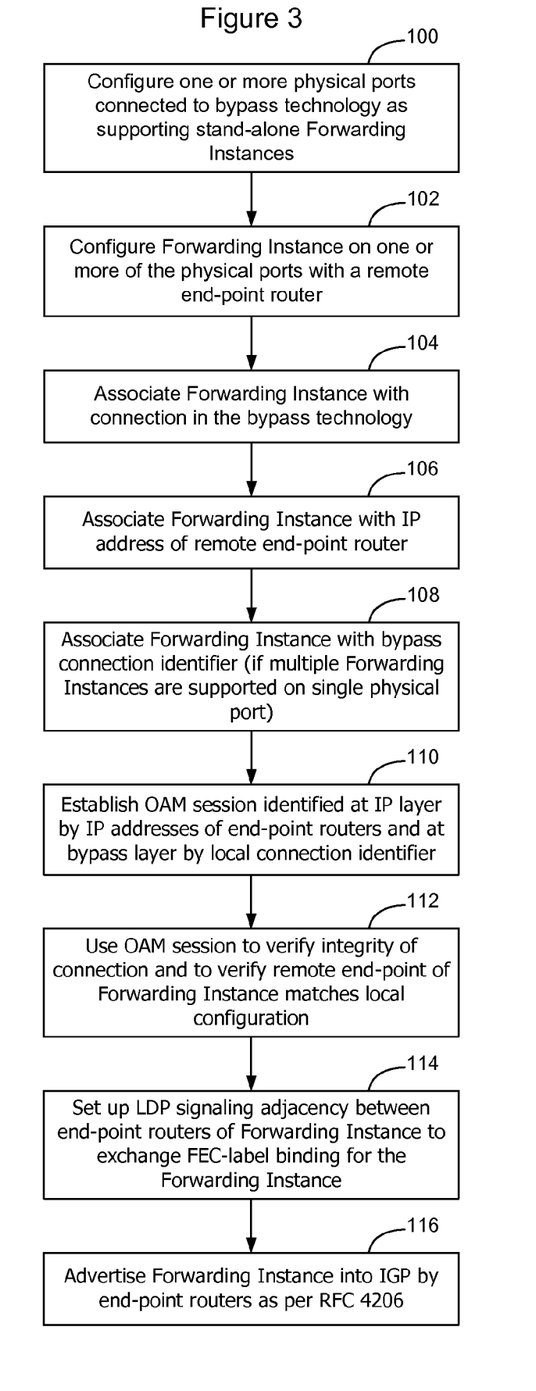
FIG. 3 is a flow chart illustrating creation of Forwarding Instances between end-point routers without establishing an associated Routing Adjacency for each Forwarding Instance to provide bypass connectivity between the routers without incurring the associated overhead associated with establishing a Routing Adjacency according to an embodiment of the invention.

FIG. 3 shows a flow chart of a process that may be used to reduce the number of Routing Adjacencies required to support Forwarding Instances between end-point routers on an MPLS network. In the embodiment shown in FIG. 3, the control plane is separated from the data plane, so that the detailed topology of the bypass component of the data plane is hidden from the MPLS and IP routing control planes, and IP/MPLS is the client of a transparent bypass (server) layer. Further the IP routing control plane is separated from the components of the bypass layer visible to the IP routing layer. This enables fewer Routing Adjacencies to be used to support a larger number of Forwarding Instances.

In the embodiment shown in FIG. 3, a network administrator or other entity will configure one or more physical ports connected to the bypass technology on an end-point router (PE router) to support stand-alone Forwarding Instances (100). As noted above, the bypass technology is the underlying transport network technology, which will typically be SONET/SDH, OTN, or Ethernet, although the invention is not limited to an implementation that operates using one of these particular types of bypass technology. Configuring the physical ports to support stand-alone Forwarding Instances requires minor modification to the end-point routers, since conventional end-point routers will automatically attempt to bring up a Routing Adjacency whenever a transparent bypass connection offered according to a client-server model is configured on a router port.

In the embodiment shown in FIG. 3 this is suppressed, so that a Routing Adjacency is not automatically brought up (neither with the other peer end-point router nor with the underlying Bypass technology) when a Forwarding Instance is configured at a physical port connected to the bypass technology. Accordingly, a larger number of Forwarding Instances may be implemented without the concomitant large number of Routing Adjacencies.

In addition to configuring one or more of the physical ports to support stand-alone Forwarding Instances, the actual Forwarding Instance must also be configured between the physical port on the end-point router and on a peer end-point router on the other side of the MPLS network (102). As used herein, one end of the Forwarding Instance will be referred to as the "local" end-point router and the other end of the Forwarding Instance will be referred to herein as the "remote" end-point router.

To enable the underlying bypass technology to carry data traffic on the Forwarding Instance, the Forwarding Instance will also be associated with a connection in the bypass technology (104). For example, in an Ethernet network, the Forwarding Instance may be associated with a traffic engineered path through the Ethernet network. This enables the traffic to be forwarded by the bypass network between the local and remote end-point routers. Likewise, the Forwarding Instance will be associated with the IP addresses of the local and remote end-point routers so that the traffic has context within the IP layer of the network (106). Preferably, although not required, the Forwarding Instance at the local physical port will be associated with the IP loopback address of the remote end-point router, and will be associated at the remote physical port with the IP loopback address of the local end-point router.

If only one Forwarding Instance is supported on a particular physical port, the bypass technology will know to associate all traffic on that port with a particular connection identifier within the bypass network. Hence, an explicit association of bypass connection identifier and Forwarding Instance may not be required in this situation at the physical port. However, if the physical port supports multiple Forwarding Instances, the bypass connection identifier should be associated with the Forwarding Instance (108) so that the bypass network can disambiguate traffic received from the physical port and correctly transport the traffic on the correct bypass connection across the network. Preferably, where an Ethernet network is being used to implement the bypass technology, the bypass connection identifier may be implemented as an Ethernet VLAN ID. Use of an Ethernet VLAN ID as the bypass connection identifier enables existing capabilities of routers to shape traffic onto a VLAN to be used without modification, to prevent congestive loss in the bypass network.

Once the pair of end-point routers have been configured to implement the Forwarding Instance, an OAM session will be established (110) over the connection. The OAM session will be identified to the bypass technology by the local identifier, and will be identified at the IP layer by the routers' respective IP addresses. The OAM session enables the end-point routers to verify the integrity of the connection. Additionally, the OAM session enables the local router to verify that the remote end-point router of the Forwarding Instance matches the local configuration (112). Thus, the OAM session enables the local end-point router to determine both (1) that the Forwarding Instance is implemented on a working data path and (2) that the local end-point router has formed a Forwarding Instance with the correct remote end-point router.

In addition to establishing an OAM session, the pair of end-point routers will set up a Label Distribution Protocol LDP (signaling) adjacency between themselves to enable the end-point routers to exchange labels that will be used to identify packets having particular Forwarding Equivalency Class (FEC) to label bindings (114). This enables the end-point routers to inspect traffic received from their attached CE routers and apply labels to the traffic so that the remote end-point router can use the label to determine how to forward the traffic that is received over the Forwarding Instance from the bypass technology. Frequently where the LERs are directly connected by the bypass technology, the addition of an MPLS Packet Switched Network (PSN) layer label is redundant and is accommodated for in the MPLS architecture by the use of penultimate hop popping (PHP).

The end-point routers will also advertise the Forwarding Instance into the Interior Gateway Protocol (IGP) in use on the MPLS network (116) as if it is an RFC 4206 Forwarding Adjacency. This enables the other nodes on the MPLS network to learn of the presence of the Forwarding Instance so that the Forwarding Instance is properly considered by routing algorithms and incorporated into the distribution of the traffic matrix on the network, whilst hiding the details of the Forwarding Instance from all except the end-point routers.

Figure 6:
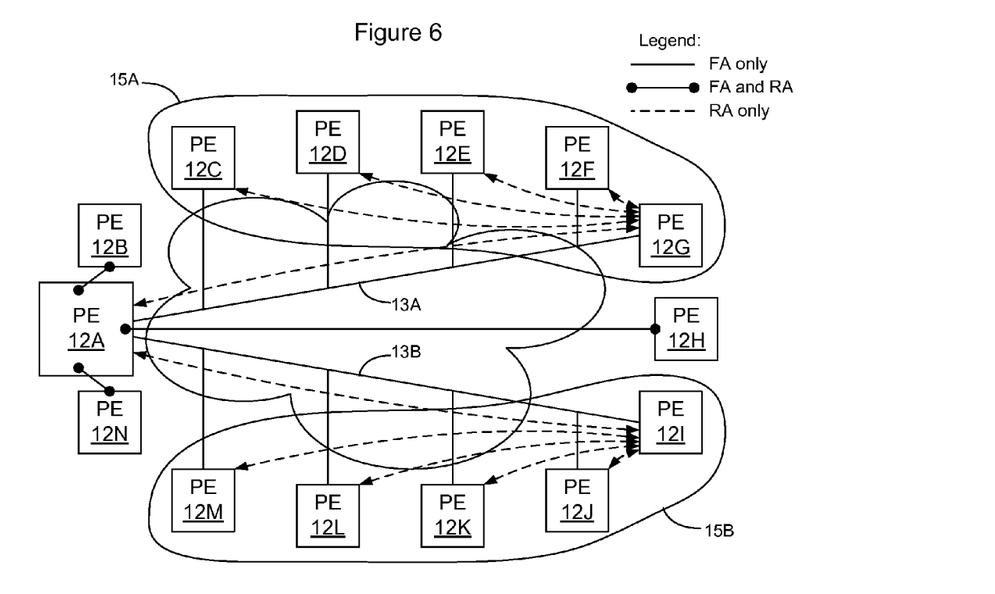
FIG. 6 is a functional block diagram of an MPLS network showing a full mesh of Forwarding Adjacencies with a reduced set of Routing Adjacencies implemented using emulated LAN segments on the underlay network according to another embodiment of the invention.

FIG. 6 shows conceptually how configuring stand-alone Forwarding Instances at physical ports of the end-point routers may reduce the number of Routing Adjacencies supported by the end-point routers. Specifically, as shown in FIG. 6, the end-point router 12A has a full set of Forwarding Instances with each of the other end-point routers 12B-12N. This is shown by the lines extending from end-point router 12A to each of the other end-point routers. However, the end-point router 12A does not maintain a separate Routing Adjacency for each of the Forwarding Instances. Routing Adjacencies are shown by the dots on the ends of the Forwarding Instances, to conceptually show that fewer Routing Adjacencies are used to support a larger number of Forwarding Instances. Although the end-point router 12A can implement standard Routing Adjacency/Forwarding Adjacency combinations in a normal manner as shown by the connection between end-point router 12A and end-point routers 12B, 12D, 12G, and 12K, the end-point router 12A is not required to implement separate Routing Adjacencies to establish Forwarding Instances. Hence, fewer Routing Adjacencies are required to implement a full mesh of interconnections at the bypass layer than would be required using normal IETF routing procedures.

Figure 5:
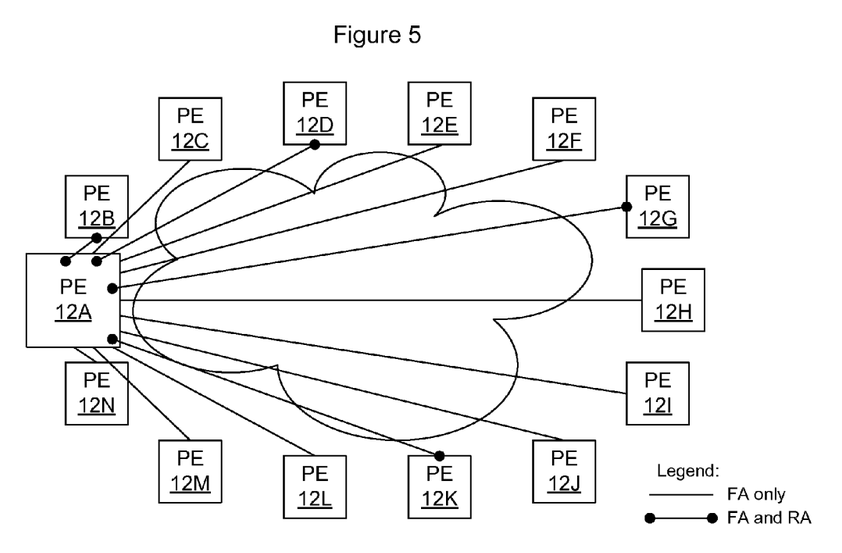
FIG. 5 is a functional block diagram of an MPLS network showing that subset of Forwarding Adjacencies associated with a single end-point router of a full mesh of Forwarding Adjacencies with a reduced set of Routing Adjacencies between end-point routers in the MPLS network according to an embodiment of the invention.

As shown in FIG. 5, since the IGP floods topology information on every Routing Adjacency, a router only needs a subset of its ports to be full Routing Adjacencies in order to robustly learn the IP topology of the MPLS network. The other ports thus are configured to support Forwarding Instances only, running only data plane OAM sessions for integrity checking, with a consequent substantial improvement in the total number of connections between MPLS routers that may be offered by the underlying bypass layer.

In some instances it may not be possible or desirable to modify the end-point routers to enable Forwarding Instances to be configured directly on the physical ports. According to another embodiment, the scaling benefits of the invention combined with the TE properties may be realized by associating the Routing Adjacencies with emulated LAN segments in the bypass technology. In this embodiment, end-point routers form Routing Adjacencies on all NNI ports whenever a Forwarding Adjacency is established on the NNI port. The bypass technology, however, is configured to demultiplex traffic received on the basis of protocol to offer two types of connectivity to the directly connected router ports: a configured mesh of point-to-point connections between the end-point routers that has the desired traffic engineering properties, and an emulated Ethernet LAN segment offering Multi-Point to Multi-point connectivity between the same set of end-point routers. In this embodiment, the configured mesh of engineered point-to-point connections is used to carry MPLS traffic, while the emulated LAN segment is used to carry IP traffic. The bypass technology can determine on a per packet basis the type of traffic, for example by looking at the Ethertype value when the traffic is handed off to the bypass layer. The bypass technology can also be arranged to become self-configuring with the end point MAC information, by sharing information learned by bridging the control LAN segment with the traffic engineered mesh.

By forming a mesh of Forwarding Adjacencies with associated Routing Adjacencies for MPLS traffic, the number of MPLS Forwarding Adjacencies is thus limited to 20 or 30 per end-point router. However, by using one or a small number of emulated LAN segments for IP traffic, a single Routing Adjacency or a small number of Routing Adjacencies may be used for all of the IP traffic. Thus, IP traffic may be forwarded over the bypass layer to all other end-point routers without requiring any modification to the end-point routers and without requiring a large number of Routing Adjacencies to be instantiated on the end-point router.

This approach exploits the fact that Interior Gateway Protocols such as Open Shortest Path First (OSPF) and Intermediate System to Intermediate System (IS-IS) both have embedded and optimized models for resilient routing over LAN segments. Specifically, both of these protocols enable a Designated Router (DR) to be elected, and then provide for all of the other routers on the LAN segment to form a Routing Adjacency only with the designated router. Since only a single Routing Adjacency is required for each router on the emulated LAN segment (apart from the router performing the role of the Designated Router), this minimizes the routing overhead processing load. Multiple emulated LAN segments may be configured on the network to keep the load on each Designated Router to an acceptable level or to permit the association of distinct routing metrics with different communities of interest in the network. Once connectivity over the emulated LAN segment has been established, each end-point router further establishes the required LDP signaling adjacencies with each of the other MPLS routers associated with the LAN segment for exchanging label bindings. This signaling, which is carried over IP, is diverted to the LAN segment offered by the bypass technology. However the LER MAC addresses learned are used by both the LAN segment and the engineered connectivity, hence between IP and MPLS connectivity will be common. Hence any relevant information gleaned from the signaling exchange informs the engineered connectivity.

Figure 4:
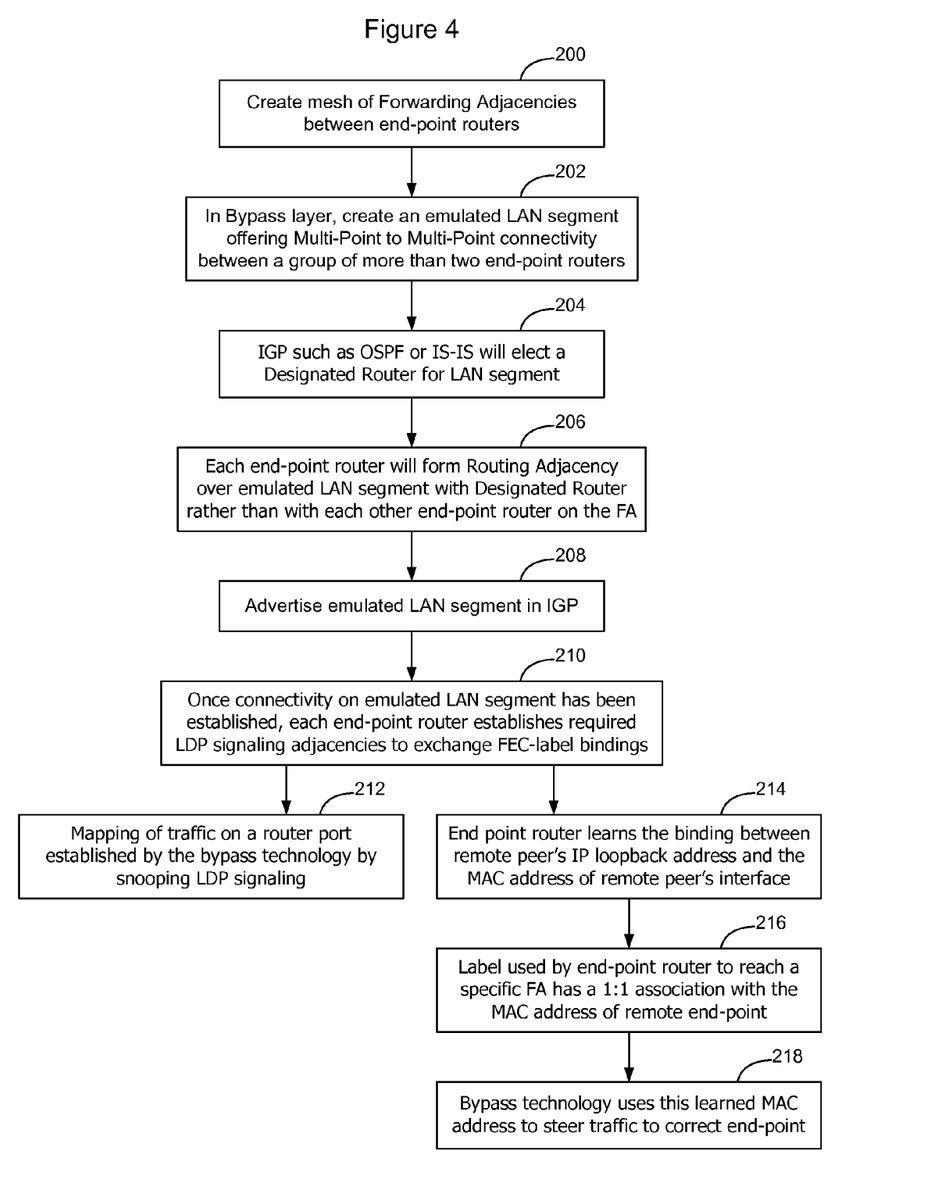
FIG. 4 is a flow chart illustrating creation of Forwarding Adjacencies associated with emulated LAN segments to use a reduced number of Routing Adjacencies to support a plurality of Forwarding Adjacencies between end-point routers in an MPLS network according to an embodiment of the invention.

FIG. 4 shows a flow chart of a process that may be utilized to implement this embodiment of the invention. As shown in FIG. 4, for MPLS traffic the end-point routers will create a mesh of Forwarding Adjacencies between the end-point routers (200). An emulated LAN segment will also be created in the bypass layer offering multi-point to multi-point connectivity between a group of more than two end-point routers. A single emulated LAN segment may be used to interconnect all end-point routers or multiple emulated LAN segments may be used to interconnect sub-groups of the end-point routers (202).

A Designated Router (DR) will be elected via the Interior Gateway Protocol (IGP) in use on the network (204) and each end-point router that has a Forwarding Adjacency associated with the emulated LAN segment will form a Routing Adjacency over the emulated LAN segment with the Designated Router rather than with each other end-point router on the Forwarding Adjacency (206). The emulated LAN segment will then be advertised in the Interior Gateway Protocol (208). Once connectivity on the emulated LAN segment has been established, each end-point router connected to the emulated LAN segment will establish the required LDP signaling adjacencies with each other end-point router connected to the emulated LAN segment so that FEC-label bindings may be exchanged between the end-point routers (210).

The end-point routers will use the FEC-label bindings to attach labels to packets before handing off the packets to the bypass technology for transportation over the underlying bypass technology. Since the MPLS router will use the Forwarding Adjacency to pass traffic intended to be forwarded to different MPLS endpoints, the bypass technology should learn associations between port/label and the required bypass route through the underlying bypass technology. There are several ways that this may occur. For example, the bypass traffic received from a router port may be established by having the bypass technology snoop the LDP signaling (212). This enables the bypass technology to learn what label/port is associated with the remote end-point router so that appropriate bypass connection identifier may be associated with the traffic.

Alternatively, as shown in FIG. 4, one side effect of the LDP signaling setup is that an end-point router learns the binding between its remote peer's IP loopback address and the MAC address of its remote peer's interface (214). Embodied within proposals for 802.1aq is a concept of shared I-SID forwarding whereby C-MAC to B-MAC bindings learned by one I-component can be shared with peer I-components. In this way the bindings learned during the establishment of the control adjacency can be utilized to correctly map MPLS packets to the appropriate B-MAC tunnels without actually having to perform any actual inspection of the control exchange. The underlying Ethernet bypass technology will simply learn the connectivity that the MPLS layer believes to exist. This follows from the fact that the bypass technology is a true server layer and appears as a simple connection to the IP layer. Thus, a label used by an end-point router to reach a specific forwarding association has a one-to-one association with the MAC address of the remote end-point (216). This enables the bypass technology to use this learned MAC address to steer traffic onto the correct route to the intended MPLS endpoint (218).

One side benefit of having the bypass technology route traffic based the destination MAC address of the remote end-point router interface is that the protection mechanisms inherent in the bypass technology may be used to offer protection or restoration of the Forwarding Adjacency, so that these functions are transparent to the IP layer.

In this embodiment, like in the previous embodiment, the end-point routers should establish IP layer OAM sessions between each of the Forwarding Association peers, to validate bypass connection integrity and to receive rapid notification of any failure. Alternatively they could utilize connectivity fault management OAM mechanisms specified by IEEE 802.1ag.

FIG. 6 shows an example network of end-point routers in which the bypass technology will separate generalized router to router adjacencies into distinct connectivity for the routing and signaling aspects (routing adjacency), and the actual forwarding of traffic (forwarding adjacency). A LAN segment supports the routing adjacencies associated with the connectivity offered by the bypass technology (13A) that has been created between end-point router 12A and a first set of end-point routers associated with a first emulated LAN segment 15A established within the bypass technology. A corresponding set of engineered paths has been established between the same set of end-point routers onto which all non control plane traffic will be steered. The set of routers on the emulated LAN, 12A, 12C, 12D, 12E, 12F and 12G will collectively elect a designated router with which each will establish a routing adjacency. They will also establish a full mesh of signaling adjacencies with each other over the LAN connectivity. Actual labeled traffic will be steered by the bypass technology onto the physical/logical paths that implement the forwarding aspect of the adjacency.

In the example shown in FIG. 6, the bypass technology has established a set of point to point paths on behalf of end-point router 12A to a peer set of end-routers and has also a established a LAN segment interconnecting the same set of end point routers.

The Interior Gateway Protocol in use on the network will cause one of the routers on each of the emulated LAN segments to be elected as the designated router for that emulated LAN segment. In this example, end-point router 12G has been elected as the designated router for emulated LAN segment 15A and, accordingly, all of the end-point routers connected to the emulated LAN segment will form a routing adjacency with designated router 12G. The routing adjacencies formed with the designated router are shown using dashed lines in FIG. 6. Similarly end-point router 12I has been elected as the designated router in emulated LAN segment 15B and, accordingly, each end-point router connected to that LAN segment will form a Routing Adjacency with the elected end-point router.

When routing has converged, the end point routers will commence forwarding MPLS traffic between themselves over the bypass technology. When the bypass edge device receives traffic identified as MPLS it will demultiplex it onto the bypass point to point connections, instead of simply steering the traffic onto the emulated LAN segment, on the basis of the combination of Ethertype and the destination MAC information in the Ethernet encapsulation.

The emulated LAN segment is created within the bypass technology using capabilities of the bypass technology and, accordingly, no modification of the end-point routers is required to enable the end-point router to connect to the emulated LAN segment. Likewise, the manner in which the nodes elect a designated router and form a Routing Adjacency with the designated router is provided by the interior gateway protocol in use on the network. Accordingly, this aspect also does not require any modification to the end-point routers to implement.

Note, however, that by associating generalized Adjacencies with a hybrid of an emulated LAN segment and full mesh of engineered point to point paths in the bypass technology, an end-point router is only required to implement a single Routing Adjacency while enabling the bypass technology to be used to forward data to multiple other end-point routers. This, in effect, enables the number of Routing Adjacencies to be minimized while enabling the end-point router to transmit data in a deterministic point-to-point manner through the underlying bypass technology to each of the other end-point routers on the network. Hence, the number of Routing Adjacencies required to be implemented by the end-point router is reduced as compared to the number of Routing Adjacencies the end-point router would be required to implement if each Forwarding Adjacency were implemented as a point-to-point manner.

Figure 7:
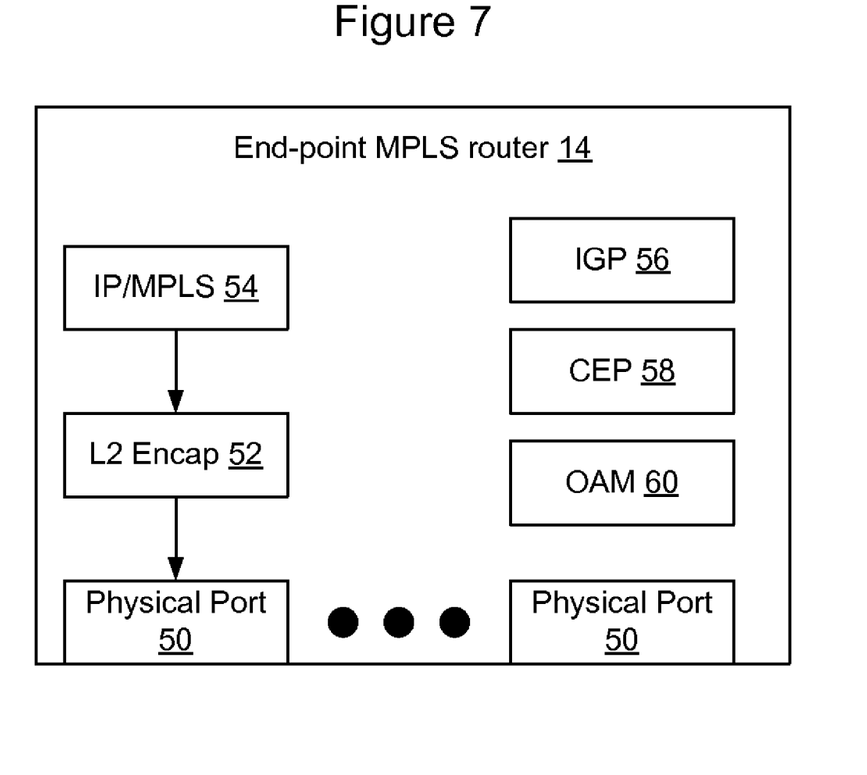
FIG. 7 is a functional block diagram of an example end-point router.

FIG. 7 shows an example end-point router 14 that may be used to implement an embodiment of the invention. As shown in FIG. 7, the end-point router has a plurality of physical ports 50 that enable traffic to be passed onto the bypass technology. Example ports 50 may be Ethernet ports, SONET/SDH ports, OTN ports, or other types of ports depending on the particular bypass technology deployed to support the overarching MPLS network.

The end-point router further includes protocol-specific processes and hardware configured to perform L2 encapsulation 52 on traffic received for transportation on the network. Likewise, the end-point router has an MPLS process and hardware 54 configured to determine forwarding equivalency classes associated with a received packets and apply MPLS labels to the packets prior to transmission onto the MPLS network. The MPLS process will selectively handoff packets of data to the L2 encapsulation process for transportation on bypass routes implemented between pairs of MPLS routers by the bypass technology.

The end-point router further has particular modules to enable it to operate on the network. For example, in FIG. 5 the end-point router includes an Interior Gateway Protocol (IGP) process 56 enabling the end-point router to participate in the exchange of routing information on the network. The IGP process further enables the end-point router to interpret routing information received via protocol exchanges and use that routing information to make forwarding decisions and other decisions affected by routing information on the network.

The end-point router further includes a Connection Establishment Process (CEP) 58 configured to enable the end-point router to implement Forwarding Instances and Forwarding Adjacencies associated with emulated LAN segments as discussed in greater detail above, and more particularly as discussed in connection with FIGS. 3 and 4. The connection establishment process also enables Routing Adjacencies to be selectively created, either alone or in connection with the IGP process, for particular Forwarding Adjacencies as discussed in greater detail above.

The end-point router also has one or more OAM processes 60 designed to implement OAM flows on the network. The OAM process may implement a separate OAM flow for each connection established via the bypass technology. OAM packets may preferably be injected at the IP layer, or directly into the bypass technology.

The functions described above may be implemented as a set of program instructions that are stored in a computer readable memory and executed on one or more processors on the computer platform. However, it will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, a state machine, or any other device including any combination thereof. Programmable logic can be fixed temporarily or permanently in a tangible medium such as a read-only memory chip, a computer memory, a disk, or other storage medium. All such embodiments are intended to fall within the scope of the present invention.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense.

What is claimed is:

1. A method for providing scalable engineered bypass connectivity between end-point routers in an MPLS network, the method comprising the steps of:
    configuring a physical port of a first end-point router on the MPLS network to support a stand-alone Forwarding Instance without an associated Routing Adjacency, the physical port of the first end-point router being connected to an underlying bypass technology supporting the MPLS network using a client-server relationship and enabling connectivity through the bypass technology to implement the Forwarding Instance;

configuring a physical port of a second end-point router on the MPLS network to support the same stand-alone Forwarding Instance without an associated Routing Adjacency, the physical port of the second end-point router being connected to the underlying bypass technology supporting the MPLS network, configuring the stand-alone Forwarding Instance on a local end-point router, and associating the Forwarding Instance with an IP address of the remote end-point router and configuring the stand-alone Forwarding Instance on the remote end-point router, and associating the Forwarding Instance with an IP address of the local end-point router, configuring a path to be used by traffic passing over the Forwarding Instance through the bypass technology to associate the path in the bypass technology with the Forwarding Instance between the first and second end-point routers; and establishing an Operation Administration and Maintenance (OAM) session on the Forwarding Instance to verify connectivity on the Forwarding Instance and configuration of the Forwarding Instance.

2. The method of claim 1, wherein the end-point routers are Provider Edge (PE) routers.

3. The method of claim 1, wherein the underlying bypass technology is based on an Ethernet standard.

4. The method of claim 1, wherein the step of configuring the Forwarding Instance further comprises the step of associating the stand-alone Forwarding Instance with a connection in the bypass technology.

5. The method of claim 1, wherein the physical port supports a single Forwarding Instance, and wherein the bypass technology associates the single Forwarding Instance with a particular connection through the bypass technology to the remote end-point router.

6. The method of claim 1, wherein the physical port supports multiple Forwarding Instances, and wherein the step of configuring the Forwarding Instance further comprises the step of associating a different bypass connection identifier with each Forwarding Instance supported by the physical port.

7. The method of claim 6, wherein the bypass connection identifier is a Virtual Local Area Network (VLAN) tag.

8. The method of claim 1, wherein the OAM session is an IP layer OAM session implemented to verify both configuration and connectivity of the Forwarding Adjacency.

9. A method for providing scalable engineered bypass connectivity between end-point routers in an MPLS network, the method comprising the steps of:

enabling an adjacency to be formed at a physical port of a local end-point router on the MPLS network, the physical port being connected to an underlying bypass technology supporting the MPLS network using a client-server relationship and enabling connectivity through the bypass technology to implement the adjacency;

associating control plane traffic of the adjacency with an Emulated LAN segment in the bypass technology, the emulated LAN segment being configured to interconnect a group of three or more of the end-point routers in a multi-point to multi-point arrangement;

using an Interior Gateway Protocol to elect one of the end-point routers from the group of end-point routers as a Designated Router and to form a Routing Adjacency with the Designated enabling the local end-point router to use the adjacency to forward MPLS traffic onto the adjacency to each of the other routers of the group of end-point routers associated with the emulated LAN segment; and Router to enable one Routing Adjacency to be formed by each non-designated router on the LAN segment; and enabling the local end-point router to use the adjacency to forward MPLS traffic onto the adjacency to each of the other routers of the group of end-point routers associated with the emulated LAN segment; and using point-to-point connectivity in the bypass technology to forward the MPLS traffic from the end-point router to all other routers of the group of end-point routers.

10. The method of claim 9, further comprising the step of separating bearer traffic onto engineered paths where the path/endpoint bindings have been gleaned by inspection of control plane traffic.

11. The method of claim 10, further comprising the step of learning, for each endpoint router in the group of end-point routers, a binding between an IP loopback address of the endpoint router and a MAC address of an interface on the endpoint router that is configured on the forwarding adjacency.

12. The method of claim 11, wherein the MAC address is a customer MAC (C-MAC) address.

13. The method of claim 12, further comprising the step of sharing the IP loopback address/C-MAC address binding with the bypass technology.

14. The method of claim 13, further comprising the step of using the IP loopback address and C-MAC address by the bypass technology to determine a connection within the bypass technology.

15. The method of claim 14, wherein a label used by an end-point router to reach a Forwarding Adjacency has a 1:1 association with the MAC address of the remote end-point router.

16. The method of claim 9, further comprising the step of establishing Label Distribution Protocol (LDP) signaling adjacencies to exchange Forward Equivalency Class (FEC) to label bindings with each of the group of end-point routers.

17. The method of claim 16, further comprising the step of snooping control plane traffic by the bypass technology to learn mapping of label to bypass connection information.

18. The method of claim 17, wherein the control plane traffic is LDP signaling.

* * * * *